I. KITSEE.
TELEGRAPHY.
APPLICATION FILED DEC. 19, 1908. RENEWED MAR. 9, 1911.
1,005,715.
Patented Oct. 10, 1911.
2 SHEETS—SHEET 2.
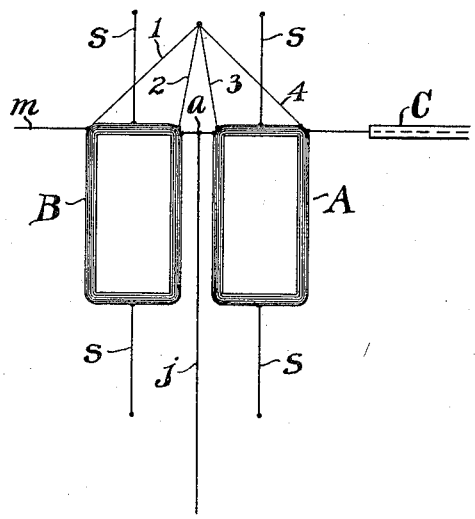
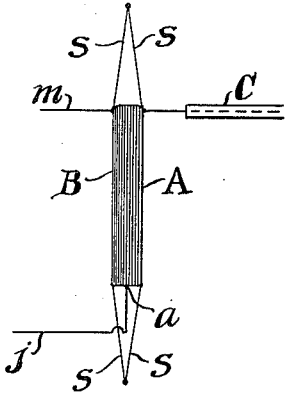
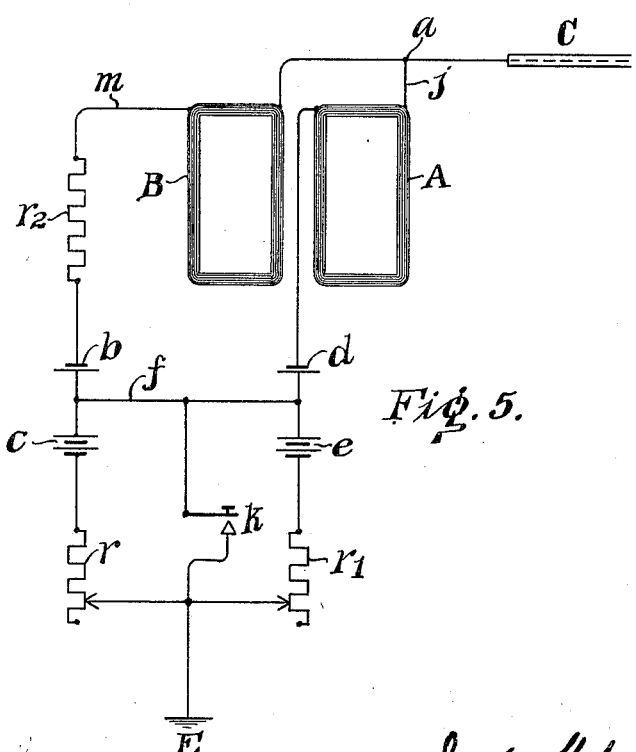
WITNESSES
Daniel O. Webster, Jr.
A. E. Steinbock
INVENTOR
Isidor Kitsee
Cornelius D. Ehret
BY
his ATTORNEY
COLUMBIA PLANOGRAPH CO., WASHINGTON, D. C.

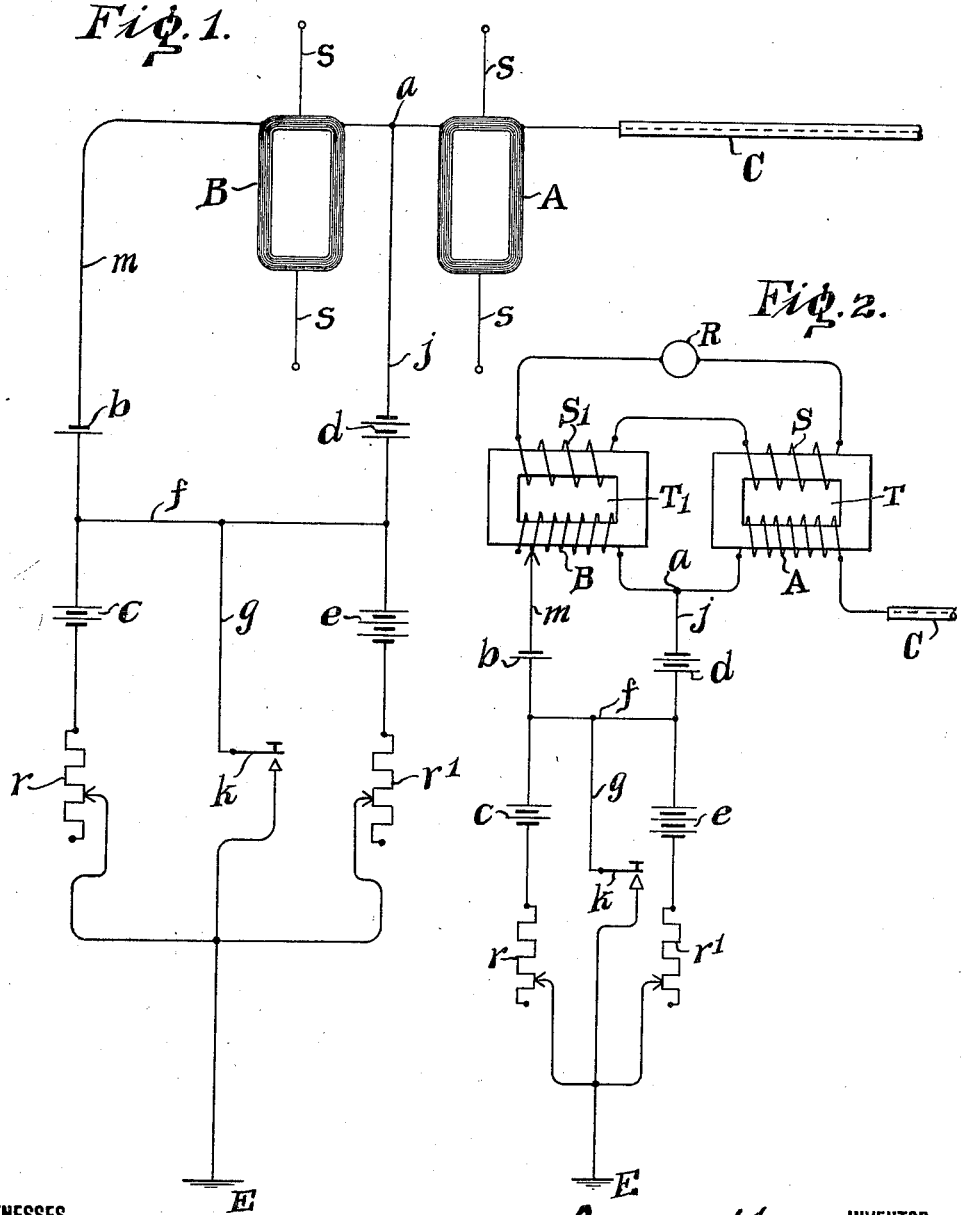

UNITED STATES PATENT OFFICE.

ISIDOR KITSEE, OF PHILADELPHIA, PENNSYLVANIA.

TELEGRAPHY.

1,005,715. Specification of Letters Patent. Patented Oct. 10, 1911.

Application filed December 19, 1908, Serial No. 468,267. Renewed March 9, 1911. Serial No. 613,429.

*To all whom it may concern:*

Be it known that I, ISIDOR KITSEE, a citizen of the United States, residing in the city of Philadelphia, county of Philadelphia, and State of Pennsylvania, have invented a new and useful Improvement in Telegraphy, of which the following is a specification.

My invention relates to telegraphy and particularly, though not exclusively, to telegraphy over long lines or cables which have great capacity causing well known disturbing effects in the transmission of signals. And my invention relates to electric telegraphy in general and particularly, though not exclusively, to duplex telegraphy.

It is the object of my invention to provide in telegraphic apparatus means whereby a received impulse will cause a response in the receiving apparatus, while an impulse transmitted to line or cable from the same station shall cause no effect in the receiving apparatus. To this end, I provide in or associate with the receiving apparatus two windings or coils, such as stationary coils or windings of a converter or transformer, or other device, or movable coils, as of a siphon recorder, movable coil relay, or other device, the two coils or windings being connected in or associated with the line or cable, opposed sources of energy being associated with each of the windings or coils, and a single key being provided to control all the sources.

My invention resides in further features hereinafter pointed out and claimed.

For an illustration of two of the many forms my invention may take, reference is to be had to the accompanying drawing, in which:

Figure 1 is a diagrammatic view of a telegraphic system involving my invention, wherein two preferably movable coils are involved. Fig. 2 is a diagrammatic view illustrating a telegraphic system involving my invention, in which the two windings form primaries of converters or transformers. Fig. 3 is a fragmentary diagrammatic view illustrating separate movable coils A and B mechanically connected together. Fig. 4 is a fragmentary diagrammatic view showing the two movable coils unitary, in edge view. Fig. 5 is a diagrammatic view illustrating modified mode of connection of the coils or windings.

Referring to Fig. 1, C represents the line or cable, which extends between the two stations, and with which are associated the two coils A and B. These coils A and B are here shown as movable coils supported by the torsion suspensions, $s$, $s$, as in a siphon recorder, relay, or other device in which a movable coil is supported in a magnetic field. The coils A and B may, however, constitute a single or unitary coil, such as a siphon recorder coil, movable relay coil, or other coil, in which a tap is taken out between the outside terminals, either midway or at any other suitable point. Or A and B may be independent coils mounted in the same instrument or in the same magnetic field, or they may be in entirely separate instruments, as siphon recorders, separate relays, or other separate instruments.

When the coils A and B are in the same magnetic field, or are unitary, they may be so wound or so connected that with a current in a given direction they tend to move in opposite directions. And when the coils A and B are separate they may be so wound and mechanically connected, that with a given current the torque of one coil neutralizes the torque of the other, so that no deflection results under circumstances hereinafter described.

From a point $a$ between the coils or windings A and B, extends a conductor $j$ in which is connected a source of energy $d$. In opposition to the source $d$ is connected a second source $e$, preferably of different power than the source $d$, an adjustable resistance $r^1$ intervening between $e$ and the earth connection E. A conductor $m$ leads from the other terminal of the coil or winding B to the source $b$. The source $c$ is connected in opposition to $b$ and is preferably of different power. The adjustable resistance $r$ intervenes between the source $c$ and the earth connection E. A conductor $f$ connects points between the opposed sources of energy of each pair of sources, and from the conductor $f$ extends a conductor $g$, which connects to earth E through the operator's key $k$. I have found it desirable that the source $d$ be of greater power than the source $b$, and the source $e$ may be of the same or greater power than the source *d*, or may be of the same or greater power than the source *c*. Furthermore, I have found it desirable that the resistance between the source *b* and the point *a*, which includes the coil or winding B, should be relatively low.

In general, the operation is as follows: A received impulse transmitted from a distant station will pass over the cable or line C and traverses the coil A, and finds its way to earth through the lower resistance path through the conductor *j*, only an inappreciable amount of the received impulse passing to earth through the conductor *m*. The received current traversing the winding or coil A causes such coil to deflect in its magnetic field as well understood in the art, such deflection being used to produce or control the production of a visible, audible, or other signal. In transmitting signal current to the cable or line C, the operator manipulates the key *k*. When he closes the key *k* a current of a given polarity is established upon the line or cable C, and when the key *k* is open, a current of opposite polarity is established. But whatever the direction or polarity of the current transmitted, the current through the coil B causes a torque in opposition to and balancing the torque of the coil A, so that the coils stand still or produce no deflection, but are always ready to respond to a received impulse. It follows, therefore, that the receiving instrument comprising the coils A and B always responds to a received impulse, while in transmission of signal current the coils A and B are not disturbed by the transmitted current. And in the case where the coils A and B are not movable and mechanically connected to each other, whether in the same or different instruments, but are stationary coils or windings to produce magnetizing effects for any purpose, they neutralize each other in their effects under the influence of current transmitted to line or cable from the same station, but one of them is always responsive to a received current.

The number of convolutions and resistances in the coils or windings A and B may be made anything suitable or desirable, so long as the neutralizing effect of one upon the other is attained.

Referring to Fig. 2, the parts are the same as in Fig. 1, except that the coils or windings A and B constitute primaries of the transformers T and $T^1$ respectively, which are preferably of closed magnetic circuit types. As here shown the coils A and B are wound in opposite directions with respect to each other, while their respective secondaries S and $S^1$ are wound in the same direction with respect to each other and connected in series in the secondary circuit including the instrument R, which may be a polarized relay, siphon recorder, or any other suitable translating device or receiving instrument. The coil or winding B may be made adjustable as shown as to its number of convolutions or turns. And it is preferred that the secondary windings S and $S^1$ have fewer convolutions or turns than the primaries A and B. Here again, the resistance between the source *b* and the point *a* is preferably relatively low and the relation of the sources *b*, *c*, *d* and *e* is the same as described in connection with Fig. 1. A received impulse traverses the primary A, only an inappreciable amount passing through the coil B. This received impulse passes to earth then through the conductor *j* and causes an induced current in the secondary circuit to act upon or control the instrument R. And in transmission, upon closing and opening the operator's key *k*, currents of different polarities are established in the line or cable C. But the primaries A and B being wound in opposite directions, the transmitted current induces equal and opposite currents in the secondaries which neutralize each other and, therefore, have no effect upon the receiving instrument R.

In Fig. 3, the two movable coils A and B are mechanically connected together by the fibers or other suitable members 1, 2, 3 and 4, the circuit connections being the same as in Fig. 1 or as in Fig. 5.

In Fig. 4 the coils A and B are shown as unitary, and therefore mechanically connected to each other, the circuit connections being the same as shown in Fig. 1. It is to be understood, however, that the coils may be connected in the manner shown in Fig. 5.

In Fig. 5 a modified form of circuit arrangement is shown, the coil B being connected directly to the cable C, and the coil A being connected in effect in conductor *j* of Fig. 1. Here the sources *b* and *d* may be made of equal powers, and the sources *c* and *e* may also be of equal power. Between the source *b* and the point *a* the resistance is made relatively high, as, for example, by introducing a resistance $r^2$.

It follows, therefore, that duplex telegraphy may be carried on by the arrangements shown, the receiver being always responsive to received current, but unresponsive to or unaffected by current transmitted from the same station.

What I claim is:

1. The combination with a line, of two windings associated therewith, signal reproducing means controlled by said windings, a pair of opposed sources of energy associated with each winding, similar sources of different pairs being of different powers and opposed to each other with respect to one of said windings, said winding being of relatively low resistance, and a single key controlling said sources for impressing currents of different polarities upon said line or cable.

2. The combination with a line, of a plurality of movable coils, signal reproducing means controlled by said coils, opposed sources of energy associated with each coil, and a single key controlling said sources of energy to impress signal current upon said line.

3. The combination with a line, of a plurality of movable coils associated therewith, signal reproducing means controlled by said coils, a pair of opposed sources of energy associated with each coil, and a single key for controlling said sources of energy for impressing signal current upon said line.

4. The combination with a line, of a plurality of movable coils associated therewith, signal reproducing means controlled by said coils, opposed sources of energy associated with each coil, a key, and a connection to earth through said key from all the points between opposed sources of energy.

5. The combination with a line, of a plurality of movable coils mechanically connected, opposed sources of energy associated with each coil, and a single key controlling said sources of energy to impress a signal current upon said line.

6. The combination with a line, of a plurality of movable coils mechanically connected, a pair of opposed sources of energy associated with each of said coils, and a single key for controlling said sources of energy for impressing signal current upon said line.

7. The combination with a line, of a plurality of movable coils mechanically connected, opposed sources of energy associated with each coil, a key, and a connection to earth through said key from all the points between opposed sources of energy.

8. The combination with a line, of a plurality of movable coils mechanically connected, a pair of opposed sources of energy associated with each coil, a key, and a connection to earth through said key from each of the points between opposed sources of a pair.

9. The combination with a line, of two movable coils associated therewith, signal reproducing means controlled by said coils, a source of energy associated with each coil, said sources being so disposed as to cause no local flow of energy through one coil, and a key for controlling said sources.

10. The combination with a line, of two movable coils associated therewith, signal reproducing means controlled by said coils, a source of energy associated with each coil, said sources being connected in opposition to each other with respect to one coil, and a key for controlling said sources of energy.

11. The combination with a line, of two movable coils mechanically connected associated therewith, and associated transmitting apparatus, both coils being traversed by transmitted current, and only one coil traversed by received current.

12. The combination with a line, of two movable coils mechanically connected associated therewith, opposed sources of energy associated with each coil, and a single key for controlling said sources to transmit current to line, both of said coils traversed by transmitted current, and only one coil traversed by received current.

13. The combination with a line, of two movable coils mechanically connected associated therewith, a pair of opposed sources of energy associated with each coil, and a key controlling both pairs of sources for impressing signal current upon said line, the two pairs of sources being opposed to each other with respect to one of said coils.

14. The combination with a line, of two movable coils mechanically connected associated therewith, a pair of opposed sources of energy associated with each coil, and a single key for controlling said sources, whereby current from one pair of sources traverses both coils, and current from the other pair of sources traverses only one coil.

15. The combination with a line, of two movable coils associated therewith and producing opposite torques, signal reproducing means controlled by said coils, transmitting apparatus, transmitted current traversing both coils, and received current traversing only one coil.

In testimony whereof I have hereunto affixed my signature in the presence of the two subscribing witnesses.

ISIDOR KITSEE.

Witnesses:
A. E. STEINBOCK,
E. T. MCCALL.

---

Copies of this patent may be obtained for five cents each, by addressing the "Commissioner of Patents, Washington, D. C."